(12) United States Patent
Battle et al.

(10) Patent No.: US 11,119,772 B2
(45) Date of Patent: Sep. 14, 2021

(54) CHECK POINTING OF ACCUMULATOR REGISTER RESULTS IN A MICROPROCESSOR

(71) Applicant: International Business Machines Corporation, Armonk, NY (US)

(72) Inventors: Steven J Battle, Austin, TX (US); Brian D. Barrick, Pflugerville, TX (US); Susan E. Eisen, Round Rock, TX (US); Andreas Wagner, Weil im Schoenbuch (DE); Dung Q. Nguyen, Austin, TX (US); Brian W. Thompto, Austin, TX (US); Hung Q. Le, Austin, TX (US); Kenneth L. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/705,362

(22) Filed: Dec. 6, 2019

(65) Prior Publication Data
US 2021/0173649 A1 Jun. 10, 2021

(51) Int. Cl.
*G06F 9/30* (2018.01)
*G06F 9/38* (2018.01)
(Continued)

(52) U.S. Cl.
CPC ........ *G06F 9/30101* (2013.01); *G06F 9/3013* (2013.01); *G06F 9/30123* (2013.01);
(Continued)

(58) Field of Classification Search
CPC .......................... G06F 9/3863; G06F 9/30101
See application file for complete search history.

(56) References Cited

U.S. PATENT DOCUMENTS 6,434,584 B1 8/2002 Henderson et al.
9,361,111 B2 6/2016 Scalabrino et al.
(Continued)

OTHER PUBLICATIONS

Al-Haija, Q.A., et al., "An Engineering Design of 4-Bit Special Purpose Microprogrammed Processor", Procedia Computer Science, Oct. 2013, pp. 512-516, vol. 21.
(Continued)

*Primary Examiner* — Jacob Petranek
(74) *Attorney, Agent, or Firm* — Scully, Scott, Murphy & Presser, P.C.

(57) ABSTRACT

A computer system, processor, and method for processing information is disclosed that includes at least one processor having a main register file, the main register file having a plurality of entries for storing data; one or more execution units including a dense math execution unit; and at least one accumulator register file, the at least one accumulator register file associated with the dense math execution unit. The processor in an embodiment is configured to process data in the dense math execution unit where the results of the dense math execution unit are written to a first group of one or more accumulator register file entries, and after a checkpoint boundary is crossed based upon, for example, the number "N" of instructions dispatched after the start of the checkpoint, the results of the dense math execution unit are written to a second group of one or more accumulator register file entries.

18 Claims, 8 Drawing Sheets

(51) Int. Cl.
  *G06F 17/16* (2006.01)
  *G06F 9/48* (2006.01)
  *G06F 9/451* (2018.01)

(52) U.S. Cl.
  CPC .......... *G06F 9/3863* (2013.01); *G06F 9/3893* (2013.01); *G06F 9/451* (2018.02); *G06F 9/4881* (2013.01); *G06F 17/16* (2013.01)

(56) References Cited

U.S. PATENT DOCUMENTS

| | | | |
|---|---|---|---|
| 9,841,974 B2 | 12/2017 | Wilson et al. | |
| 9,946,549 B2 | 4/2018 | Wright | |
| 10,019,230 B2 | 7/2018 | Elmer | |
| 10,019,357 B2 | 7/2018 | Busaba et al. | |
| 2005/0138323 A1 | 6/2005 | Snyder | |
| 2006/0041610 A1* | 2/2006 | Hokenek | G06F 7/5443 708/620 |
| 2008/0178048 A1 | 7/2008 | Balazich et al. | |
| 2009/0006905 A1* | 1/2009 | Luick | G06F 9/3853 714/52 |
| 2011/0238962 A1 | 9/2011 | Cain, III et al. | |
| 2014/0006755 A1 | 1/2014 | Gueron et al. | |
| 2016/0026607 A1 | 1/2016 | Codrescu et al. | |
| 2016/0224340 A1 | 8/2016 | Moudgill et al. | |
| 2016/0224514 A1* | 8/2016 | Moudgill | G06F 15/8053 |
| 2017/0132010 A1* | 5/2017 | Vasekin | G06F 9/384 |
| 2017/0185410 A1 | 6/2017 | Abernathy et al. | |
| 2018/0203703 A1 | 7/2018 | Moudgill et al. | |
| 2019/0012170 A1* | 1/2019 | Qadeer | G06F 9/30134 |
| 2019/0020360 A1* | 1/2019 | Balasubramanian | G06F 9/383 |
| 2019/0171448 A1* | 6/2019 | Chen | G06F 9/3867 |
| 2019/0332903 A1 | 10/2019 | Nealis et al. | |
| 2020/0117450 A1* | 4/2020 | Mansell | G06F 9/30101 |

OTHER PUBLICATIONS

Akhmetov, A., "Design of a Minimal processor on an FPGA", overleaf.com, Oct. 1, 2015, 12 pages.

Hsu, W.-C., et al.; "Floating Accumulator Architecture", Advanced Science and Technology Letters, (CST 2016), Apr. 21, 2016, pp. 157-162, vol. 123.

Pachghare, A.A., et al., "A Review on Microprocessor and Microprocessor Specification", International Journal of Science, Engineering and Technology Research (IJSETR), Feb. 2013, pp. 449-454, vol. 2, Issue 2.

International Search Report dated Feb. 25, 2021 received in International Patent Application No. PCT/IB2020/060911, 8 pages.

* cited by examiner

CHECK POINTING OF ACCUMULATOR REGISTER RESULTS IN A MICROPROCESSOR

BACKGROUND OF INVENTION

The present invention generally relates to data processing systems, processors, and more specifically to accumulator register files in processors, including accumulator registers associated with one or more dense math execution units such as, for example, one or more matrix-multiply-accumulator (MMA) units.

Processors currently used in data processing systems process more than one instruction at a time, and often process those instructions out-of-order. In modern computer architecture, there are several known ways to design a computer adapted to perform more than one instruction at a time, or at least in the same time frame. For example, one design to improve throughput includes multiple execution slices within a processor core to process multiple instruction threads at the same time, with the threads sharing certain resources of the processor core. An execution slice may refer to multiple data processing hardware units connected in series like a pipeline within a processor to process multiple instructions in a single processing cycle. Pipelining involves processing instructions in stages, so that a number of instructions are processed concurrently. Multiple execution slices may be used as part of simultaneous multi-threading within a processor core.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. An instruction in the issue queue typically is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units. Register files typically have information read from and/or written to entries or locations in the register file.

To increase computation throughput a processor can include specialized computation units, e.g., matrix-multiply-accumulator units (MMA units), to handle various data types and to perform highly-parallel tasks. Processing wide single instruction, multiple data flows (SIMD) is one way to achieve high computational throughput. In a microprocessor, it is not uncommon to have register renaming of in-flight instructions to improve out of order execution. However, where machine deep learning uses execution unit(s) with high compute capability, e.g., MMA units, register renaming can result in a lot of data movement which can consume power, and can also introduce unnecessary execution bubble and latency.

SUMMARY

The summary of the disclosure is given to aid understanding of a computer system, computer architectural structure, processor, register files including accumulator register files, and method of using register files in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their method of operation to achieve different effects.

In one or more embodiments, a computer system for processing information is disclosed. The computer system for processing information in an embodiment includes at least one processor having a circuit and logic to process instructions, the processor having: a main register file associated with the at least one processor, the main register file having a circuit and a plurality of entries for storing data, one or more write ports to write data to the main register file entries, and one or more read ports to read data from the main register file entries; one or more execution units having a circuit and logic, the one or more execution units including a dense math execution unit; and at least one accumulator register file having a circuit and a plurality of entries for storing data, the at least one accumulator register file associated with the dense math execution unit. The processor in an aspect is configured to process data in the dense math execution unit where the results of the dense math execution unit are written to a first group of one or more accumulator register file entries, and after a checkpoint boundary is crossed, based upon, for example, the number "N" of instructions dispatched after the start of the checkpoint or after every "Nth" dispatched instruction, the results of the dense math execution unit are written to a second group of one or more accumulator register file entries. The processor in one or more aspects is further configured to write results back to the first group of one or more accumulator register file entries multiple times. In an embodiment, the processor is further configured to write data from the groups of one or more accumulator register file entries to the main register file. Preferably, the processor is configured to write data from the groups of one or more accumulator register file entries to a plurality of main register file entries in response to an instruction accessing a main register file entry that is mapped to an accumulator register file entry in the groups of one or more accumulator register file entries.

According to one or more embodiments, the accumulator register file is local to the dense math unit. The dense math execution unit in an embodiment is a matrix-multiply-accumulator (MMA) unit and the accumulator register file is located in the MMA. The bit field width of the accumulator register file preferably is wider than the bit field width of the main register file, and in an embodiment, each entry in the accumulator register file is mapped to a plurality of main register file entries. The computer system in one or more embodiments further includes: a dispatch unit having a circuit and logic to dispatch instructions; an instruction completion table (ICT) having a circuit and logic to track dispatched instructions, the ICT having a plurality of entries to store data; and a mapper having a circuit and logic to map one or more main register file entries to one or more accumulator register file entries, wherein the dispatch unit notifies the mapper that the second group of accumulator register file entries is being allocated and the mapper renames the first group of one or more accumulator register file entries to the second group of accumulator register file entries. In a further aspect, the processor is configured to prime the accumulator register file to receive data in response to an instruction targeting the accumulator register file, and in response to priming the accumulator register file a first checkpoint is created and the dispatch unit sends a first checkpoint begin iTag corresponding to the first checkpoint to the ICT and stores the first checkpoint begin iTag.

In an aspect, the checkpoint boundary is based upon the number "N" of instructions dispatched since the start of the checkpoint (e.g., since the checkpoint begin iTag), and after the dispatch unit dispatches the number "N" of instructions (or in another example after every Nth instruction), the dispatch unit detects that a dispatched instruction will trigger the allocation of the second group of accumulator register file entries and a second checkpoint is created. In an embodiment, in response to the second checkpoint being created, the dispatch unit sends a second checkpoint begin iTag to the ICT corresponding to the second checkpoint and stores the second checkpoint begin iTag. In one or more aspects, the dispatch unit tracks a current checkpoint begin iTag, and all instructions younger than the current checkpoint begin iTag belong to the checkpoint associated with the respective group of one or more accumulator register file entries. The ICT in an embodiment determines based upon the number of instructions dispatched by the dispatch unit, which instructions belong to the respective checkpoint. An encoding according to an embodiment is provided in the ICT entries to identify an instruction either as a checkpoint begin iTag or as an in a checkpoint iTag. Each checkpoint is not complete and the accumulator register file entries are not released for reuse until all the instructions (iTags) within the respective checkpoint are finished. The ICT preferably looks at the completion bits of all the instructions within the respective checkpoint and if all the instructions in the respective checkpoint are finished, the respective checkpoint is complete and the respective checkpoint mapping is released to a freelist of accumulator register file entries ready to be reallocated for use. In response to a flush operation within the second checkpoint, a flush iTag is compared against the second checkpoint begin iTag and the second checkpoint is flushed and the first checkpoint and accumulator register mapping of the first checkpoint is restored.

A processor for processing information is disclosed, the processor including: a main register file associated with the at least one processor, the main register file having a circuit and a plurality of entries for storing data, one or more write ports to write data to the main register file entries, and one or more read ports to read data from the main register file entries; one or more execution units having a circuit and logic, the one or more execution units including a dense math execution unit; at least one accumulator register file having a circuit and a plurality of entries for storing data, the at least one accumulator register file associated with the dense math execution unit, and the bit field width of the accumulator register file being wider than the bit field width of the main register file; a dispatch unit having a circuit and logic to dispatch instructions; an instruction completion table (ICT) having a circuit and logic to track dispatched instructions, the ICT having a plurality of entries to store data; and a mapper having a circuit and logic to map one or more main register file entries to one or more accumulator register file entries. The processor is configured to process data in the dense math execution unit where the results of the dense math execution unit are written to a first group of one or more accumulator register file entries multiple times, and after crossing a checkpoint boundary (e.g., after N instructions are dispatched since the start of the checkpoint or every Nth instruction), the results of the dense math execution unit are written to a second group of one or more accumulator register file entries, and wherein the processor is configured to write data from the groups of one or more accumulator register file entries back to the main register file entries.

The processor in an embodiment is configured to prime the accumulator register file to receive data in response to an instruction targeting the accumulator register file, and in response to priming the accumulator register file a first checkpoint is created and the dispatch unit sends a first checkpoint begin iTag corresponding to the first checkpoint to the ICT and stores the first checkpoint begin iTag, and further wherein, the check point boundary is based upon the number "N" of instructions dispatched after the first checkpoint begin iTag, and after the dispatch unit dispatches the number "N" of instructions, the dispatch unit detects when a dispatched instruction will trigger the allocation of the second group of accumulator register file entries and a second checkpoint is created, the dispatch unit notifies the mapper that the second group of accumulator register file entries is being allocated and the mapper renames the first group of one or more accumulator file entries to the second group of file entries, and in response to the second checkpoint being created, the dispatch unit sends a second checkpoint begin iTag corresponding to the second checkpoint to the ICT and stores the second checkpoint begin iTag.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of the computer system, computer architectural structure, processors, register files including accumulator register files, and/or their method of operation will be better understood when read in conjunction with the figures provided. Embodiments are provided in the figures for the purpose of illustrating aspects, features, and/or various embodiments of the computer system, computer architectural structure, processors, register files, accumulator register files, and their method of operation, but the claims should not be limited to the precise system, embodiments, methods, processes and/or devices shown, and the features, and/or processes shown may be used singularly or in combination with other features, and/or processes.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, register files, accumulator register files, and their method of operation, however, it will be understood by those skilled in the art that different and numerous embodiments of the computer system, computer architectural structure, processor, register files, accumulator register files, and their method of operation can be practiced without those specific details, and the claims and invention should not be limited to the system, assemblies, subassemblies, embodiments, features, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and architecture, which are apparent to those skilled in the art. It is assumed that those skilled in the art are familiar with the general architecture of processors, and, in particular, with processors which operate in an out-of-order execution fashion, including multi-slice processors and their use of registers. It may be noted that a numbered element is numbered according to the figure in which the element is introduced, and is often, but not always, referred to by that number in succeeding figures.

Figure 1:
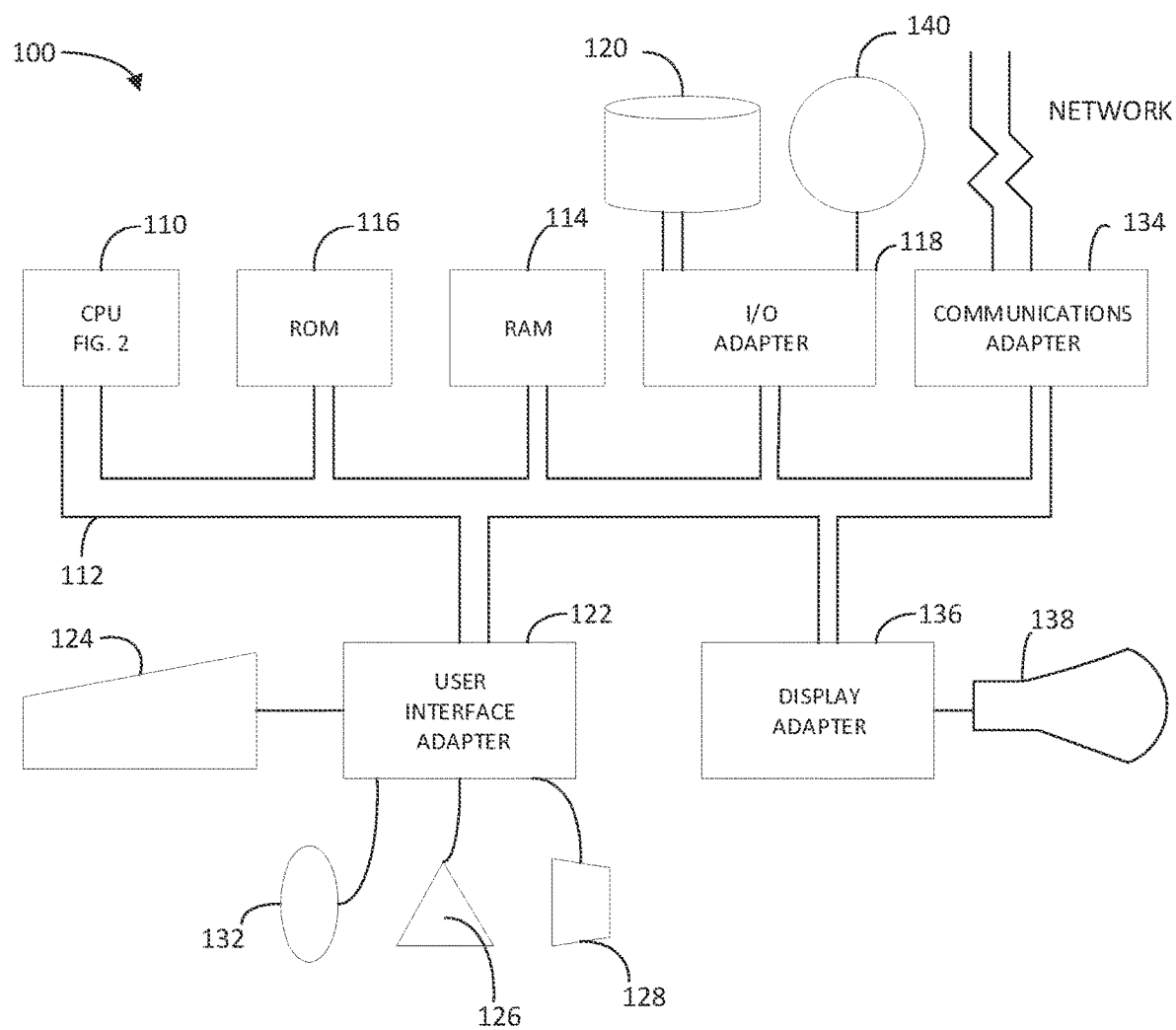
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
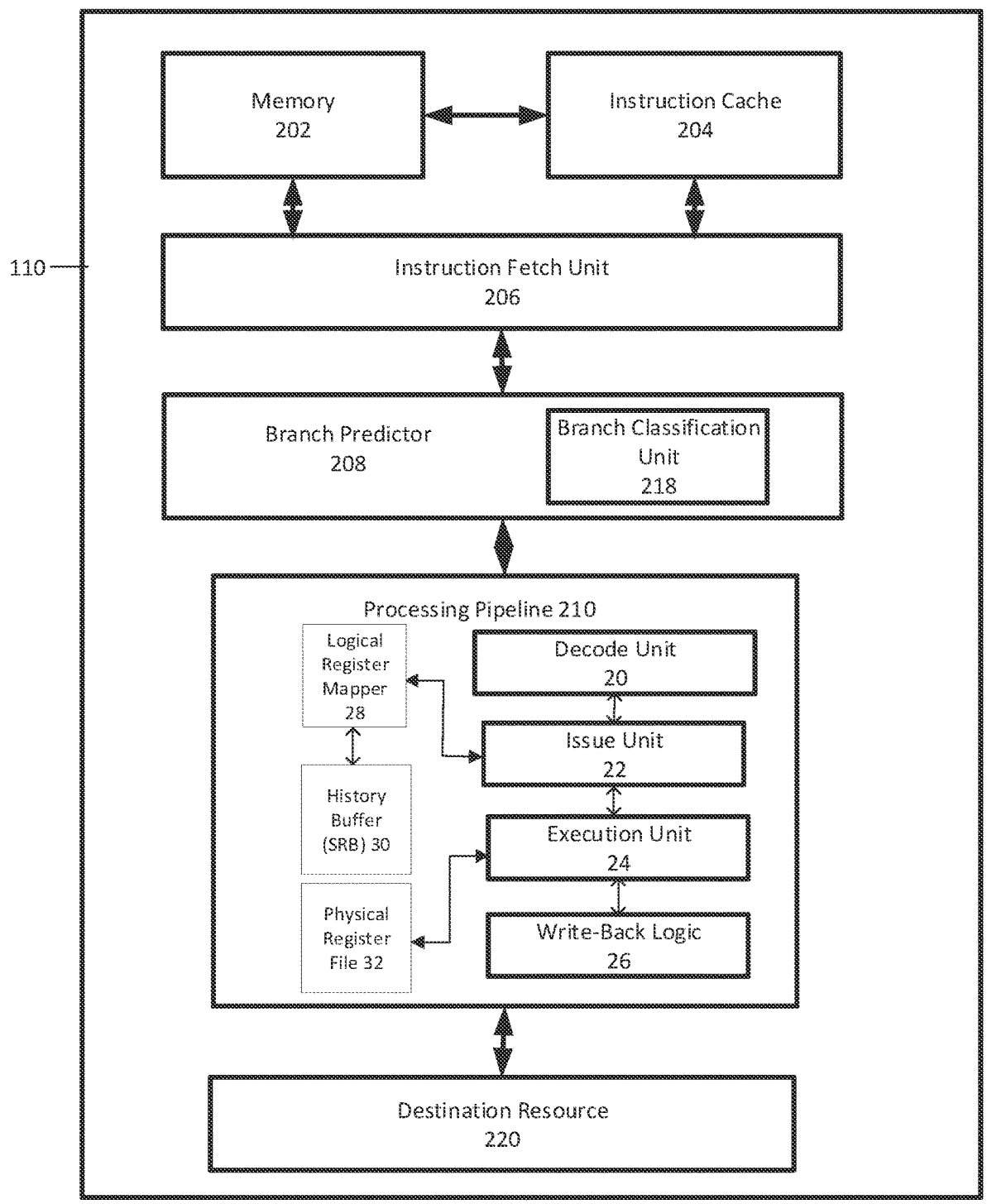
FIG. 2 illustrates a block diagram of an embodiment of a processor in which certain aspects of the present disclosure may be practiced.

FIG. 2 depicts a simplified block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory. The memory 202 and instruction cache 204 can include multiple cache levels.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units (LSUs), vector scalar execution units (VSUs), and/or other execution units. The logical register mapper 28 contains entries which provide a mapping between a logical register entry (LReg) and an entry in the physical register file 32. When an instruction specifies to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer stores information from the logical register mapper 28 when a new instruction evicts data from the logical register mapper 28 in case the new instruction is flushed and the old data needs to be recovered. The history buffer (SRB) 30 keeps the stored information until the new instruction completes. History buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

Figure 3:
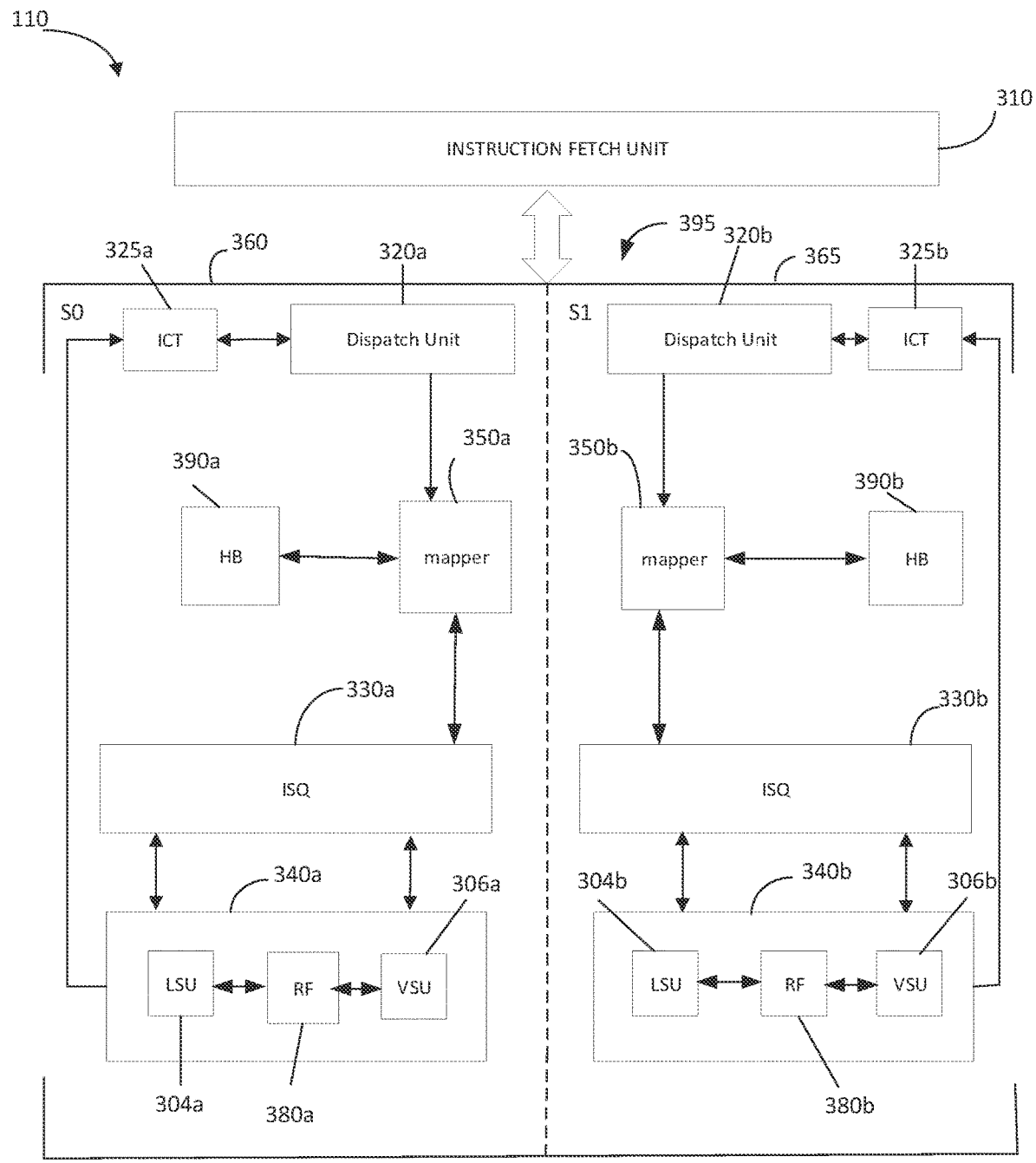
FIG. 3 illustrates a block diagram of an embodiment of a portion of a multi-slice processor.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of discussion. It will be appreciated that the multi-slice processor may have other configurations. As shown in FIG. 3, the multi-slice processor includes two processing slices-Slice 0 (slice S0 or 360) and Slice 1 (slice S1 or 365). The processor includes an Instruction Fetch unit 310. Each of the slices S0 and S1 includes an Instruction Dispatch Unit (320a and 320b); a Logical Register Mapper (350a and 350b); a History Buffer (HB) (370a and 370b); an Issue Queue (ISQ) (330a and 330b); an Instruction Completion Table (ICT) (325a and 325b); and Execution Units (340a and 340b) that include a load store unit (LSU) (304a and 304b), a vector scalar unit (VSU) (306a and 306b), and a Register File (RF) (380a and 380b). The Execution Unit 340 may include one or more queues to hold instructions for execution by the Execution Unit 340.

It may be noted that the two slices are shown for ease of illustration and discussion only, and that multi-slice processor 110 may include more than two processing or execution slices with each slice having all the components discussed above for each of the slices S0 and S1 (slices 360 and 365). Further, the processing slices may be grouped into super slices (SS 395), with each super slice including a pair of processing slices. For example, a multi-slice processor may include two super slices SS0 and SS1, with SS0 including slices S0 and S1, and SS1 (not shown) including slices S2 and S3.

The Instruction Fetch Unit 310 fetches instructions to be executed by the processor 110 or processor slice. Instructions that are fetched by the Instruction Fetch Unit 310 are sent to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data to be used in an operation specified in an instruction dispatched to an execution unit 340, and the result of the operation performed by the Execution Units 340 may be written to the designated target register entry in the physical register file 380.

In certain aspects, the ISQ 330 holds a set of instructions and the register file 380 accumulates data for the instruction inputs. A register file may be used for staging data between memory and other functional (execution) units in the processor. There may be numerous register files and types. When all source data accumulates for the instruction, the data is passed on to one or more execution units designated for execution of the instruction. Each of the execution units, e.g., LSUs 304 and VSUs 306, may make result data available on the write back buses for writing to a register file (RF) entry.

When data is not ready, e.g., not within the appropriate data cache or register, delay can result as the ISQ 330 will not issue the instruction to the Execution Unit 340. For at least this reason, the Issue Queue (ISQ) typically issues instructions to the Execution Units 340 out of order so instructions where the required data is available can be executed. Dispatch Unit 320 in one or more embodiments will stamp each instruction dispatched to the Issue Queue 330 with an identifier, e.g., identification tag (iTag), to identify the instruction. The Dispatch Unit 320 may stamp instructions with other information and meta data. The instructions (iTags) typically are allocated (assigned) and stamped in ascending program order on a per thread basis by the Dispatch Unit 320.

Logical register mapper 350 contains meta data (e.g., iTag, RFtag, etc.) which provides a mapping between entries in the logical register (e.g., GPR1) and entries in physical register file 380 (e.g., physical register array entry). The RFtag is the pointer that correlates a logical register entry to a physical register file entry. For example, when an instruction wants to read a logical register, e.g., GPR1, the logical register mapper 350 tells issue queue 330, which tells execution unit 340 where in the physical register file 380 it can find the data, e.g., the physical register array entry. The Execution Unit 340 executes instructions out-of-order and when the Execution Unit 340 finishes an instruction, the Execution Unit 340 will send the finished instruction, e.g., iTag, to the ICT 325. The ICT 325 contains a queue of the instructions (iTags) dispatched by the Dispatch Unit 320 and tracks the progress of the instructions (iTags) as they are processed.

History buffer (SRB) 390 contains logical register entries that are evicted from the logical register mapper 350 by younger instructions. The information stored in the history buffer (SRB) 390 may include the iTag of the instruction that evicted the logical register entry (i.e., the evictor iTag) from the logical register. History buffer (SRB) 390, in an embodiment, stores iTag, logical register entry number (the bit field that identifies the logical register entry (LReg)), and Register File tag (RFTag) information. History buffer (SRB) 390 may store and track other information. History buffer (SRB) 390 has an interface to the logical register mapper 350 to recover the iTag, and register file tag (RFTag) (and other meta data) for each evicted logical register entry (LReg). The information is kept in the history buffer (SRB) 390 in a history buffer (SRB) entry until the new instruction (evictor instruction) is completed. At which point, in an embodiment, the entry is removed from the history buffer (SRB) 390.

A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple execution slices may considerably increase processing speed of the multi-slice processor. In single-thread (ST) mode a single thread is processed, and in SMT mode, two threads (SMT2) or four threads (SMT4) are simultaneously processed.

In an aspect, each execution/processing slice may have its own register file as shown in FIG. 3. In another aspect, one register file may be allocated per super slice and shared by the processing slices of the super slice. In one aspect, one register file may be allocated to more than one super slice and shared by the processing slices of the super slices. For example, slices S0, S1, S2, and S3 may be allocated to share one register file. The register files will be discussed in more detail below.

In a processor, it is not unusual to have register renaming of in-flight instructions to improve out-of-order execution of instructions. However, in situations where execution units with high compute and throughput are used, e.g., dense math operations, register renaming of in-flight instructions can result in a lot of data movement that can consume power to handle, and can also introduce unnecessary delay and latency because of one or more execution bubbles. In one or more embodiments, accumulator register files are used and in an aspect a process using accumulator register file renaming with dense math instructions is performed. Accumulator register files and accumulator register file renaming processes are used so that data movement during execution is minimized to reduce power and improve execution throughput. To enter the accumulator register renaming mode, in an aspect, the accumulator registers are primed. After the accumulator registers are primed, the dense math execution unit, e.g., the matrix-multiply-accumulator (MMA) unit and/or inference engine, in one or more embodiments, can read and write the accumulator registers locally without needing to write the main register file. Preferably, the dense math execution unit accesses, reads, and or writes the same accumulator register file entry multiple times without renaming a new accumulator register file and/or writing back to the main file register. When the dense math operations are completed, and/or in response to predetermined operations and instructions, in an embodiment, the result(s) in the accumulator register file can be written to the main register file and/or main memory.

In one or more embodiments, instead of renaming every instruction, the accumulator register files are check-pointed to improve throughput and increase performance. In an aspect, the accumulator registers are renamed in the mapper at specific points, e.g., when a checkpoint boundary is crossed. Renaming the accumulator register at, or when crossing, a check point boundary, also referred to as check-pointing the accumulator registers, instead of at every instruction, improves register/accumulator register area, power, and performance, and in an embodiment contributes to flush recovery. That is, if there is, for example, a branch or load miss, the accumulator registers are flushed to the appropriate check-point, e.g., flushed back to the checkpoint begin instruction, rather than the specific flush instruction or the first dense math instruction, thus increasing recovery performance.

In one or more embodiments, a process, processor architecture, and system is described using one or more accumulator registers in association with, local to, and/or located within one or more dense math execution units, e.g., one or more inference engines and/or MMA units, preferably to handle dense math instructions. Alternatively (and/or additionally), the accumulator register files are not local to the MMA unit and are in a unified register as groups of vector/scalar (VS) registers in the VS main register file. In a further embodiment, the accumulator register has entries that have a bit field width that are wider than the bit field width of the main register file entries.

Figure 4:
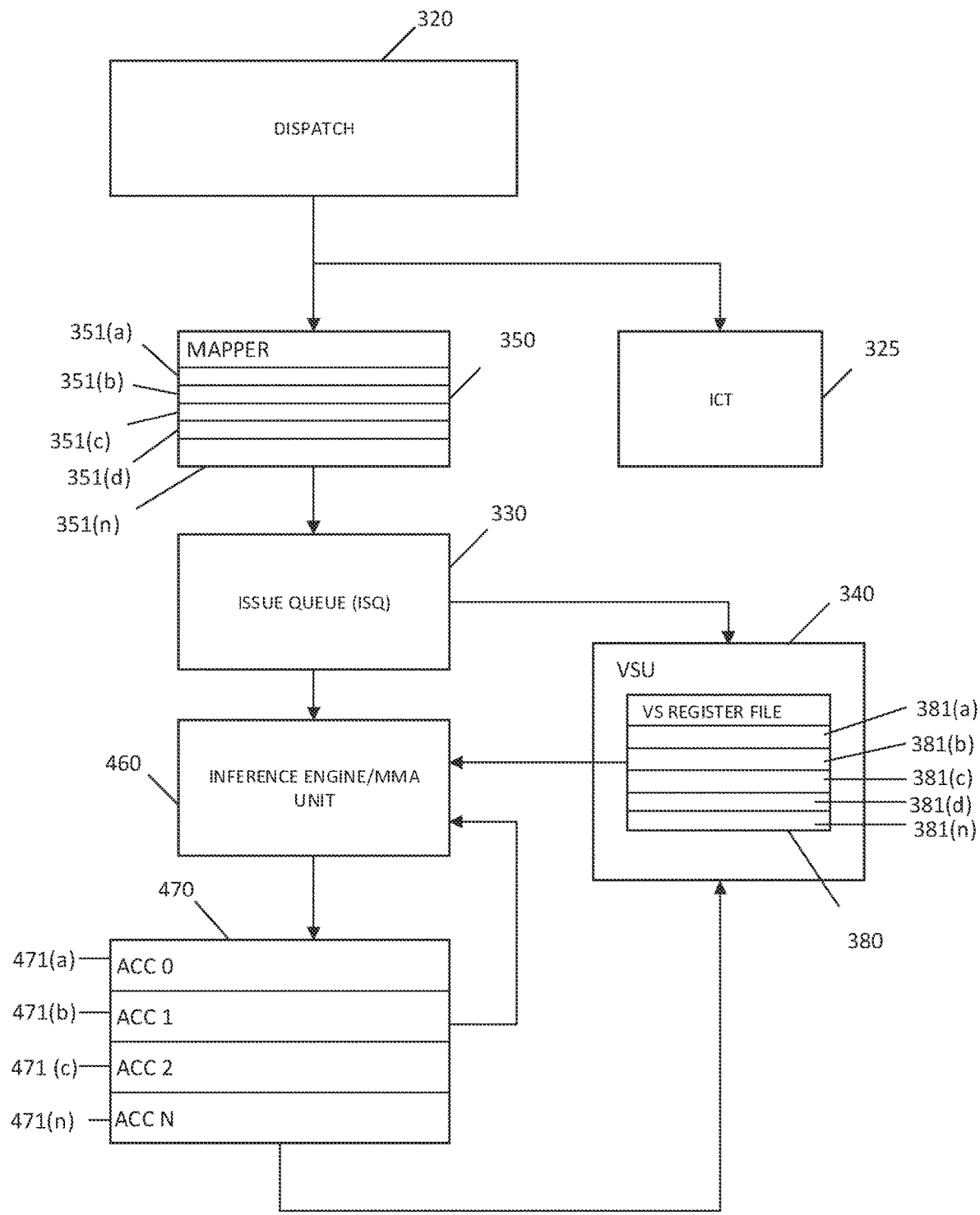
FIG. 4 illustrates a block diagram of a portion of a multi-slice processor having an accumulator register file in accordance with an embodiment of the disclosure.

FIG. 4 shows a simplified block diagram of a processing pipeline utilizing an accumulator register file in association with an execution unit, e.g., an inference engine/MMA unit, and a vector/scalar (VS) main register file located within a vector scalar (VS) execution unit (VSU). The processing pipeline or execution slice includes a dispatch unit 320, a logical mapper 350 having a plurality of entries 351(a)-351(n), an instruction complete table (ICT) 325, an issue queue (ISQ) 330, an inference engine or matrix multiply accumulator (MMA) unit 460, an accumulator register file 470 having a plurality of entries 471(a)-471(n), and a VS execution unit (VSU) 340 having a main (VS) register file 380 having a plurality of entries 381(a)-381(n). While the accumulator register file 470 is illustrated in FIG. 4 as being associated with and local to the inference engine/MMA unit 460, in one or more embodiments the accumulator register file 470 can reside within the MMA unit 460. In another aspect, the accumulator register files are in a unified register file where the accumulator register files are in the main VS register file as groups of VS registers.

During inference engine and/or MMA operations, in one or more embodiments, the accumulator register file 470 is utilized as a source and a target (accumulator). That is, in an aspect, as the MMA operates it uses operands from the accumulator register file and writes results back to the accumulator register file, and in an embodiment writes the results back to the same accumulator register file entry 471, and in an aspect to the same target accumulator register file entry 471 multiple times. In this manner, the processor, including the VS or main register file, during inference engine or MMA operations does not undergo renaming operations. In one or more embodiments, after a number of instructions are processed and/or after a checkpoint boundary is crossed, the results are written back to a different accumulator register file entry 471 in the accumulator register 470.

In an embodiment, the accumulator register file 470 is a pool of wide bit accumulator register file entries 471(a)-471(n). For example, in an embodiment, the accumulator register file 470 is a pool of thirty-two (32) physical 512 bit register entries 471, while the VS main register file is 128 bits wide. Each accumulator register file entry 471 in an embodiment holds a plurality of main register file entries, and in an embodiment holds a set of four consecutive main VS register file entries (381(n)-381(n+3)). In a simplified block diagram of FIG. 5, a VS or main register file 380 having four entries 381(a)-381(d) are shown, which are mapped to a single accumulator register entry 471 in the accumulator register file 470. In an example, four consecutive 128 bit main VS register file entries 381(a)-381(d) are mapped to a single 512 bit accumulator register file entry 471. An inference engine in an embodiment can be a set of eight (8) matrix-multiply-accumulate (MMA) units, and thirty-two (32) 512 bit accumulator registers. In one or more embodiments, there are eight (8) logical accumulator registers (ACC0-ACC7) per thread. These eight (8) logical accumulator registers are mapped to thirty-two (32) physical registers. In an embodiment, each logical accumulator register is assigned a five (5) bit tag pointing to the physical register.

Instructions are used to set-up and run the dense math execution unit, e.g., the inference engine and/or one or more MMA units. General Matrix Rank Operation ("ger") instructions are one example, and in one or more aspects perform $n^2$ operations on 2n data. The inference engine/MMA unit workload in one or more embodiments typically has three parts. The accumulator register file is primed with initial data to perform its operations. Multiply operations are performed in the MMA unit(s) and results are accumulated in the accumulator register file. That is, the accumulate operations write back to the accumulator register and the results typically are not written back to the main register file under normal operations. Accumulator registers in one or more embodiments are not renamed with every instruction. And, in an aspect when the dense math execution unit is complete, and/or in response to certain instructions, the results in the accumulator register file are written back to memory, e.g., the main register file and/or main memory. Accumulator instructions ("ger" instructions) usually have two VSR operand sources, an accumulator VSR destination, and an accumulator VSR source.

To start dense math operations, e.g., MMA unit operations, in one or more embodiments, the processor will decode and/or detect a dense math instruction, e.g., an inference engine/MMA unit "ger" instruction. Each dense math instruction in an embodiment has an iTag and will utilize one full dispatch lane and one full issue queue (ISQ) entry. In an aspect, the main register mapper 350 assigns multiple, e.g., four (4), targets (main register file entries) per dense math instruction, e.g., MMA unit instruction. For an instruction that writes the same accumulator register file entry, e.g., 471(a) in FIG. 4, the main register mapper 350 does not allocate new main register file tags RFTags (entries), but the register mapper 350 will need a new iTag for the new instruction. In an embodiment, the main register mapper 350 will mark the main register file entries 381 mapped to the accumulator register file entry 471. In an aspect, the main register mapper 350 will write the same accumulator register file iTag into a plurality of consecutive main register file entries 381, e.g., VSR(n)-VSR(n+3). That is, one iTag is aliased to a group of consecutive main register file entries, e.g., four main register file entries 381(n)-381(n+3).

The accumulator register file in one or more embodiments should be primed. In one or more embodiments, each accumulator register file is primed as needed. In one or more embodiments, priming the accumulator registers includes moving data from multiple vector registers in the STF register file attached to non-MMA execution units into the accumulator registers in the ACC array attached to the MMA execution units. The accumulator register file is primed when it is written to from memory, e.g., main register file and/or main memory, or as the result of a priming instruction. For example, an instruction, e.g., xxmtacc, can move data from the main (VS) register file to the accumulator register file in order to get the accumulator register file and the main (VS) register file in sync. In another example, an instruction, e.g., 1xacc, can load and move data from main memory to the accumulator register file. In a further example, the accumulator register file is primed where the data in its entry/entries is set to zero. Other instructions to prime the accumulator register file are contemplated.

In an embodiment, the vector scalar (VS) execution unit (VSU) will write main (VS) register primary data and the iTag of the instruction that is doing the priming into the appropriate accumulator register file entry. Priming the accumulator register file also allocates the accumulator register rename. At priming, the accumulator register target is renamed and mapped to a physical register file entry. During priming (and de-priming) of the accumulator register, multiple main register file tags, e.g., four, will issue in one shot for each accumulator register file entry. In reference to FIG. 5, during one example of priming, the accumulator register rename is allocated, and the VS register data in entries 381(a)-381(d) are written into the allocated accumulator register entry 471. In one or more embodiments, the VS execution unit will write the main (VS) register file data and iTag of the instruction that is doing the priming into the mapped accumulator register file. In one or more embodiments, an accumulator free list 472 maintains the count of allocated and free accumulator tags. The accumulator tags identify the accumulator register file entries. In an aspect, an accumulator register file busy flag is used to indicate that the accumulator register file entry is currently active. When all accumulator register file entries are occupied, dispatch will stall in similar fashion to a main register resource stall.

Figure 5:
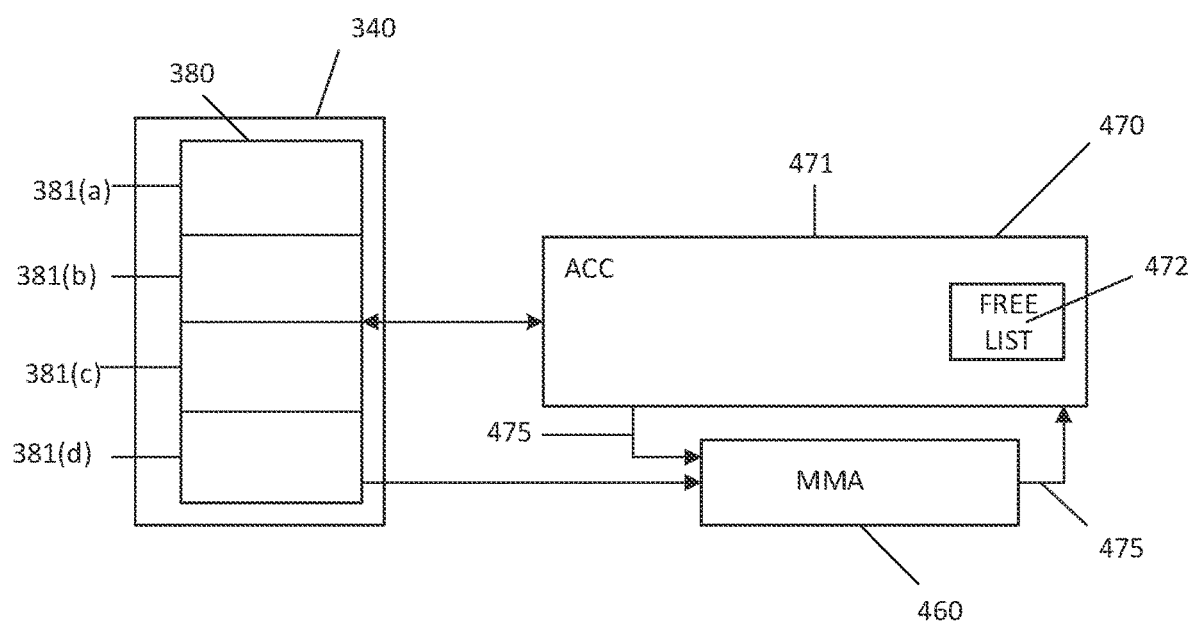
FIG. 5 illustrates a simplified block diagram showing the set-up of a MMA unit, accumulator register file and a physical VS register file in accordance with an embodiment of the disclosure.

In dense math operations, the accumulator register file is not read and written to the main (VS) register file each cycle. Instead, large data results stay local to the dense math engine, e.g., MMA unit, through use of the accumulator register file. That is, MMA unit operations are written back to the accumulator register file. In an aspect, the same accumulator register file is written to multiple, e.g., a plurality of, times. Accumulator register file entries are not renamed with every instruction. The accumulator register file in one or more embodiments is utilized as a source and a target (accumulator) during MMA operations. The loop 475 in FIG. 5 illustrates the operations of the MMA unit rewriting the same target entry 471 in the accumulator register 470.

Each MMA unit instruction writes a single accumulator register file entry and sets the state of the target accumulator register entry to dirty, indicating that the accumulator register file entry and the corresponding main (VS) register file entries are not in sync. In an aspect, for MMA unit instructions, e.g., "ger" instructions, the accumulator register file stores the result, and the main (VS) register file does not store the result. While data will not be written back to the main register file in the main execution unit, e.g., the VSU, the main execution unit will update the accumulator register file iTag when it receives a new instruction from the issue queue. For an instruction that utilizes an accumulator register file entry, the iTag of the younger instruction utilizing the accumulator register file will replace the older iTag, but the main register file tag (RFTag) will not change.

In one or more embodiments, dense math instructions that utilize the accumulator register file 470 issue from the issue queue 330 in order preferably by register number, and in an aspect by instruction type. The issue rate of dense math instructions utilizing the accumulator register file in an aspect is one instruction per cycle (except in one or more embodiments the first instruction to prime the accumulator register file can take more than one cycle). The instructions utilizing the accumulator register file preferably issue in order and back-to-back. If there are older instructions that utilize the accumulator register file, the issue queue can issue the older instructions since the older instruction will read or write the main register file, but the accumulator register file will update only the accumulator register file until the data in the accumulator register file can be written back to the main register file.

In an aspect, when a dense math instruction, e.g., a "ger" instruction, sources an accumulator register file that was not primed since the last de-prime (e.g., by xxmtacc or ldacc), the hardware will prime that accumulator register file entry. The hardware will run a sequence that primes the accumulator register file and allocates an accumulator register file entry (rename). The dense math instruction will then be executed.

The accumulator register file is de-primed and/or its data written back in response to a number of scenarios. In an embodiment, the accumulator register file is written back and/or de-primed in response to instructions, and/or where the main (VS) register file is sourced after the accumulator register is dirty. For example, in response to a move from accumulator register to main (VS) register file instruction, e.g., xxmfacc, the accumulator register file is de-primed and results in the accumulator register file are moved from the accumulator register file and written back to the main (VS) register file. In another example, in response to a move from the accumulator register file and store instruction, e.g., stxacc, the accumulator register file is de-primed and results in the accumulator register file are written back to main memory.

In one or more embodiments, when an accumulator register file entry is dirty and is accessed by the main (VS) register file, the hardware will de-prime the accumulator register. In an embodiment, the hardware will run a sequence that writes all accumulator registers back to the main (VS) register file. For example, a younger non-dense math instruction to read or write the main register file entries 381 assigned to the accumulator register file entries 471, will notify the issue queue (ISQ) 330 to start the write back process. In an aspect, the accumulator register files are de-primed when the dense math execution unit operation is complete. In one or more embodiments, a sequence of move-from-accumulator instructions are sent by the dispatch unit 320 and issued by the issue unit 330, to read the contents of the accumulator register from the accumulator register file 470. In one or more embodiments, the write back process involves stopping dispatch unit 320, and notifying the issue queue 330 to drain the data in the accumulator register file 470 before the issue queue can resume issuing instructions. In an aspect, the issue queue will hold up the dispatch unit until the accumulator register is drained, e.g., data is written to the corresponding main register file entries.

In an aspect, each accumulator register file entry will be de-primed, the data in the accumulator register file will be written into the main VS register file, and the accumulator register file will also be deallocated from the rename pool. The main register file entries (RFTags) are not deallocated if the accumulator register file 470 has not written the results to the main register file 380. The main register file entry (RFTag) 381 is deallocated when and/or in response to the data in the corresponding accumulator register file entry 471 being written to the main register file 380, e.g., in response to a younger non-dense math instruction. The accumulator register instruction is completed when the last part of the data in the accumulator register file is written back to the main register file. The iTag of the completed instruction is broadcast to the history buffer (not shown in FIG. 4) to deallocate the main register file entries (RFTags). The processor will then process the younger non-dense math instructions including reading data from the main register file. In addition, after the accumulator register file is drained, and the ACC busy flag is cleared, the issue queue can resume issuing instructions, and the dispatch unit can resume dispatching instructions. In one or more embodiments, where the accumulator register is primed and the main (VS) register file is targeted, the accumulator register will be de-primed even if the accumulator register was not dirty.

Figure 6:
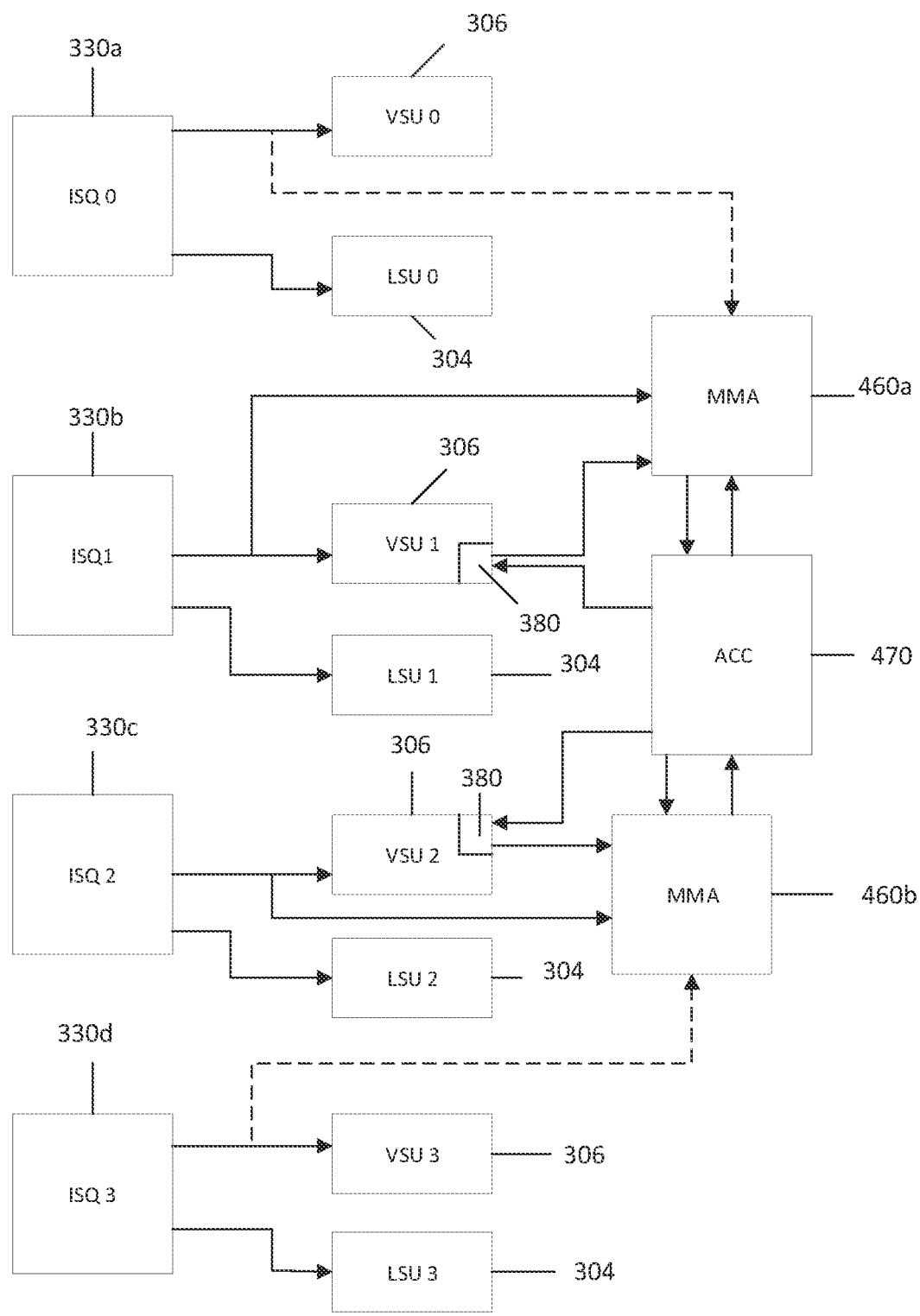
FIG. 6 illustrates a simplified block diagram of two super slices of a processor having MMA units and accumulator register files.

FIG. 6 shows another embodiment of a processor having one or more dense math execution units, e.g., matrix-multiply-accumulator (MMA) units, in association with a local accumulator register file where the processor is configured so that the operations of the one or more dense math units write results back multiple times to the same accumulator register file entry. FIG. 6 shows two super slices of a processor for handling data. Each super slice includes at least one MMA unit 460, two vector scalar (VS) execution units 306 and two load store (LS) units 304. A single accumulator register file 470 is used in connection with both the MMA units 460. In an alternative embodiment, each execution slice could have its own MMA unit with a local accumulator register file, and in a further aspect, each MMA unit has the accumulator register file contained within the MMA unit in each execution slice. In the embodiment of FIG. 6, issue queue 330*b* (ISQ1) in super slice 0 and issue queue 330*c* (ISQ2) in super slice 1 issue instructions, e.g, "ger" instructions, to the respective MMA units (460*a* and 460*b*). Alternatively, as shown by dotted lines in FIG. 6, issue queue 330*a* (ISQ0) and issue queue 330*d* (ISQ3) could issue instructions, e.g., "ger" instructions, to each MMA unit (460*a* and 460*b*) in the respective super slice.

In one or more embodiments, accumulator registers are periodically renamed. That is, after processing a number of instructions where the accumulator register file and dense math execution unit are utilized, a different group of one or more accumulator register files entries are used to process instructions targeting the dense math execution unit. The accumulator registers, in one or more embodiments, are renamed after crossing an iTag boundary. For example, when an accumulator operation crosses an iTag checkpoint boundary, the result of the dense math execution unit operation in an embodiment is written to new accumulator register entries assigned from the free pool of accumulator register entries. The iTag checkpoint boundary can be defined according to a number of criteria. For example, in an embodiment the accumulator register file entries are renamed in response to an instruction targeting an accumulator register file entry after dispatching a number "N" of instructions (iTags), e.g., 64 instructions after a checkpoint begin iTag. In another embodiment, a new checkpoint can be started after every Nth instruction, e.g, after every 64 instructions.

In an example, the prescribed or predetermined iTag boundary can be based upon sixty-four (64) instructions (iTags), but setting or using a different number "N" of instructions (iTags) or using a different Nth instruction is also contemplated. For example, setting what the number "N" of instructions dispatched since the last checkpoint begin iTag or what the every "Nth" instruction should be set at, could be varied before or during operations, and in an aspect, could be varied depending upon the number of flush operations the accumulator register file is undergoing. If there are not enough accumulator register entries in the accumulator register file available to rename the accumulator register files, the instruction(s) targeting the accumulator register file will stall at dispatch until one or more accumulator register file entries are free.

In one or more embodiments, a checkpoint is created by the first instruction (iTag) to target an accumulator register entry that is not active. In one or more embodiments, this occurs when the accumulator register is primed, or the first accumulator operation after crossing an iTag boundary to the next checkpoint. In an embodiment, a prime instruction for an accumulator register file allocates main register file entries (RFTags) to the accumulator register file entry. In an example, a prime instruction for the accumulator register files is allocated four (4) RFTags, one per main VS register entry mapped to the accumulator register file entry. In an embodiment, these are the only RFTags allocated to the accumulator register until a new "prime" instruction is dispatched. When a new prime instruction is dispatched, the prior main VS register mapping is evicted to the history buffer (SRB).

Dispatch logic in an embodiment will look for an accumulator operation targeting an inactive accumulator register entry (e.g., a priming instruction). Dispatch logic detects what type of instruction and has the accumulator register primed if an appropriate dense math execution unit operation instruction, e.g., MMA ("ger") instruction, is detected. Dispatch logic in one or more embodiments detects that an instruction is creating a new checkpoint, e.g., a set of instructions to be processed using the same group of accumulator register file entries. In one or more embodiments, dispatch sends a checkpoint begin iTag to the ICT. The ICT marks this instruction and starts the check-point. All instructions within a checkpoint will complete together. The checkpoint begin iTag is also stored in the dispatch unit, and in an embodiment, in a special completion/exceptions macro (SpComp).

In addition, in one or more embodiments, dispatch logic will look for the first accumulator operation targeting an active accumulator register file entry after crossing a checkpoint iTag boundary. That is, in an embodiment, a new checkpoint will begin (and new checkpoint begin iTag will be identified) in response to an accumulate instruction (e.g., an instruction targeting an accumulator register file entry) after crossing a checkpoint boundary. The next checkpoint boundary is set and/or determined in an embodiment based upon dispatching "N" instructions (iTags) after the previous checkpoint begin iTag. The number "N" of instructions is calculated from the checkpoint begin iTag to determine the iTag boundary. Dispatch in an embodiment informs the mapper that a new checkpoint is starting and the mapper renames the accumulator register entries. In an alternative embodiment, the checkpoint boundaries are set based upon every Nth instruction, e.g., at 64, 128, 192, 256, etc. instructions.

The dispatch unit in an aspect tracks the youngest/current checkpoint begin iTag. All instructions younger than the checkpoint begin iTag belong to that checkpoint. These instructions can be accumulate instructions or other independent operations, e.g., branches, control instructions, load instructions and/or store instructions. The ICT is provided in an embodiment with the checkpoint begin iTag from dispatch and determines, e.g., builds a mask of, which instructions are in the checkpoint. For example, an extra bit in an aspect is provided in the ICT entry to identify an instruction as either a checkpoint begin iTag or as in the checkpoint iTag. If in an example, the checkpoint begin instruction is iTag 0x05, and the checkpoint boundary is based upon every sixty-four (64) instructions, e.g., every Nth instruction, then iTags 0-4 are outside the checkpoint and iTags 5-63 are inside the checkpoint. Dispatch has the youngest/current checkpoint begin iTag, and detects when an instruction will trigger a new checkpoint. Dispatch is aware of the number of instructions that have been dispatched (through its own logic) and detects when an accumulate instruction is dispatched. In response to targeting accumulator register files after crossing an iTag boundary, dispatch in an embodiment informs the mapper that a new checkpoint is starting and the mapper renames the accumulator register entries. In an embodiment, to start a new checkpoint, a bit or encoding is used, e.g., set, to allocate new accumulator tag(s) (ACCtags) and source the old accumulator register entries. In one or more embodiments, dispatch sends the new checkpoint begin iTag to the ICT and the ICT starts the new check-point. The new check-point begin iTag is also stored in the dispatch unit, and in an embodiment, in a special completion/exceptions macro (SpComp).

In an example, the accumulator register file will hold up to three (3) checkpoints per thread. In the example where there are up to three (3) checkpoints per thread, the special completion macro (SpComp) in an aspect will store up to three (3) checkpoint begin iTags per thread. Other numbers of check-points per thread are contemplated, e.g., four (4) checkpoints per thread, and will depend in part on the size of the accumulator register file. A separate accumulator register file freelist maintains and tracks the count of allocated and free accumulator register file tags (ACCtags).

To free accumulator register files entries back to the free list so they can be reused, the instructions within the checkpoint should be completed. The ICT looks at the completion bits of the instructions (iTags) in the checkpoint (the set of instructions mapped to the same group of accumulator register file entries), and if all the instructions in the checkpoint are finished, the checkpoint is completed. When the checkpoint is completed, the mapping of the accumulator register file entries corresponding to that checkpoint are released, freeing those accumulator register file entries back to the accumulator register file freelist. In the example where the checkpoint begin iTag is 0x05 and iTags 5-63 are within the checkpoint, iTags 6-63 need to finish before that checkpoint can finish. To complete the checkpoint, in an embodiment, iTag 0x05 should be next-to-finish (NTF), all other instructions in the checkpoint should have finished, and the SpComp macro finishes the checkpoint begin instruction (iTag). The checkpoint begin iTag in an embodiment is the last instruction in the checkpoint to finish. In one or more embodiments, the SpComp macro will be processing the end/completion of a previous checkpoint, while also storing a current checkpoint begin instruction (iTag).

In an example, checkpoint 0 maps accumulator results (e.g., dense math execution unit results) to accumulator register file entries 0:7. Checkpoint 1 maps accumulator results (e.g., dense math execution unit results) to accumulator register file entries 8:15, evicting the checkpoint 0 mapping. The checkpoint mapping is evicted to the history buffer (SRB) with a bit or tag encoding, e.g., STFtag, indicating that it is an accumulator register entry. While the checkpoint mapping is evicted to the history buffer (SRB), the data in the accumulator register entries are kept in the accumulator register entries for the checkpoint. The checkpoint begin iTag in an embodiment is not finished by the Issue Queue (ISQ). This will block completion of instructions younger than the checkpoint begin iTag. In an embodiment, the checkpoint begin instruction is tagged not to finish, or finish with exception. Checkpoint 2 maps accumulator results (e.g., dense math execution unit results) to accumulator register file entries 16:23 evicting the checkpoint 1 mapping to the history buffer (SRB). When checkpoint 1 completes, checkpoint 0 mappings are released from the SRB, freeing accumulator entries 0:7 (e.g., checkpoint 0 accumulator register file entries (ACCtags)) back to the freelist. These entries (tags) are available to be assigned to new instructions in new checkpoints.

If there is a flush within a checkpoint, e.g., because of a branch or load miss, the entire checkpoint must be flushed. An exceptions macro in an aspect will compare the flush iTag against the thread's checkpoint begin iTag and generate a new flush request, flushing the checkpoint begin iTag, and restoring the prior checkpoint. The exception macro should invalidate the checkpoint begin iTag that was just flushed. The history buffer (SRB) will restore the prior accumulator register mapping to the mapper along with any other GPR or VSRs that were modified in the checkpoint. The history buffer (SRB) will restore the prior checkpoint begin iTag to both dispatch and the exceptions macro. The prior checkpoint may not have completed yet, and the checkpoint begin iTag is required for finishing the prior checkpoint.

An example of a flush operation of an accumulator register file is shown with reference to tables 1, 2 and 3 below, where tables 1 and 3 show data in the mapper and table 2 illustrates data in the history buffer (SRB). The checkpoint begin iTag is shown by bolding in Tables 1-3. The checkpoint 0 begin iTag is 0x0F (iTags 0x0E-0x3F), and the checkpoint 1 begin iTag is 0x40 (iTags 0x40-0x7F). Table 1 shows the data in the mapper prior to the flush operation and Table 2 shows the data in the history buffer (SRB) prior to the flush operation.

TABLE 1

| | Mapper | |
|---|---|---|
| ACC Reg | ACC Tag | ITAG |
| 0 | 0x10 | 0x50 |
| 1 | 0x11 | 0x51 |
| 2 | 0x12 | 0x52 |
| 3 | 0x13 | 0x53 |
| 4 | 0x14 | 0x54 |

TABLE 2

| | History Buffer (SRB) | | | | |
|---|---|---|---|---|---|
| Entry # | Evictor ITAG | Evictor ACC tag | Entry ITAG | Entry ACC tag | Entry LREG (ACC) |
| 0 | 0x41 | 0x11 | 0x10 | 0x00 | 1 |
| 1 | 0x42 | 0x12 | 0x11 | 0x02 | 2 |
| 2 | 0x40 | 0x10 | 0x0F | 0x0D | 0 |
| 3 | 0x43 | 0x13 | 0x12 | 0x05 | 3 |
| 4 | 0x44 | 0x14 | 0x13 | 0x01 | 4 |

Table 1 shows the mapper currently has checkpoint 1 data where the mapper entries have been updated with a new iTag for each accumulator instruction, but keeps the accumulator Tag (ACCtag) assigned from the checkpoint begin. The history buffer or SRB has checkpoint 0 data. In the processor there is a flush operation where the flush iTag is 0x47, which is part of checkpoint 1. In the example, checkpoint 1 has a checkpoint begin iTag of 0x40 so the processor will flush the checkpoint begin iTag 0x40 and restore the prior checkpoint. Flushing the checkpoint begin iTag 0x40 will restore history buffer (SRB) entries 0-4 (checkpoint 0) and update the mapper. Checkpoint 0 data is updated in the mapper shown in Table 3 in the shaded row.

TABLE 3

| | Mapper | |
|---|---|---|
| ACC Reg | ACC Tag | ITAG |
| 0 | 0x0D | 0x0F |
| 1 | 0x00 | 0x10 |
| 2 | 0x02 | 0x12 |
| 3 | 0x05 | 0x13 |
| 4 | 0x01 | 0x14 |

Figure 7:
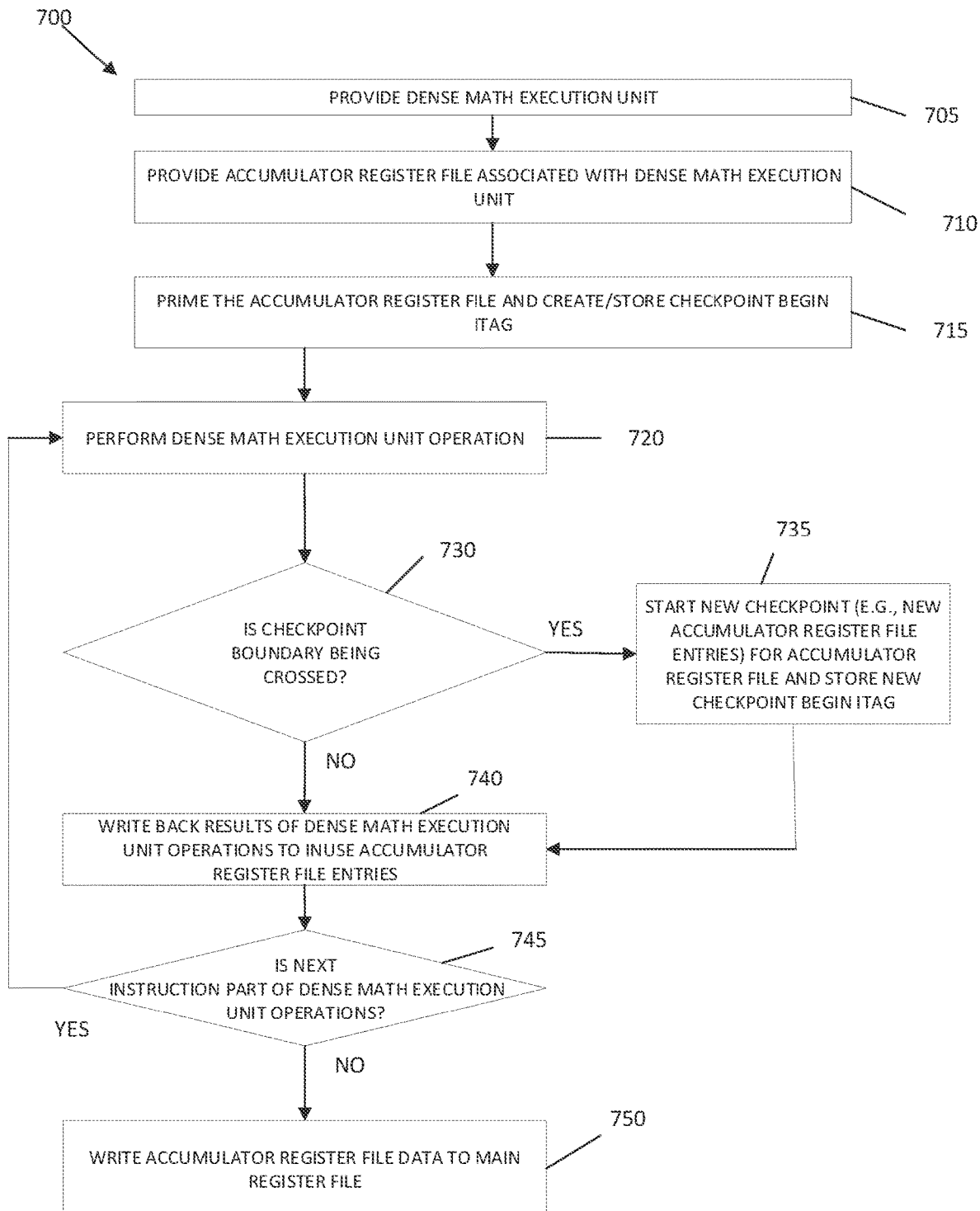
FIG. 7 illustrates a flow diagram of a method according to an embodiment for processing data in a processor.

FIG. 7 is an exemplary flowchart in accordance with one embodiment illustrating and describing a method of handling data, e.g., executing instructions, in a processor, including in an embodiment, processing and handling dense math instructions, e.g, MMA ("ger") instructions, in a processor in accordance with an embodiment of the present disclosure. More specifically, the method in an aspect is directed to checkpointing, e.g., renaming, and writing data to new accumulator register entries after a number of operations or instructions. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order.

The method 700 in FIG. 7 relates to processing data in a processor, more specifically to handling dense math operations by use of a dense math execution unit, for example, a MMA execution unit. More specifically, the method 700 in an aspect is directed to checkpointing an accumulator register file, e.g., renaming and writing data to one or more new accumulator register file entries after crossing a checkpoint boundary, e.g., after a number of operations/instructions or after a multiple (Nth) instructions. At 705, a dense math execution unit is provided. In an example, a dense math execution unit is a matrix-multiply-accumulation (MMA) unit. In one or more examples, a dense math execution unit may be multiple MMA units arranged as an inference engine. Other dense math execution units are contemplated.

In one or more embodiments, at 710, an accumulator register file is provided preferably in association with the dense math execution unit. The accumulator register file, in an embodiment, is local to one or more of the dense math execution units, and in an aspect the accumulator register file resides in a MMA unit. Preferably, the accumulator register file has a bit field width that is wider than the bit field width of the main register file in the processor. The accumulator register file in an embodiment is 512 bits wide while the main register file in the processor is 128 bits wide. Other bit widths are contemplated for the accumulator register. According to an aspect, more than one main register file entry can be mapped to an accumulator register file. For example, four consecutive main register files during operation are mapped to one accumulator register file. In an alternative embodiment, the accumulator register file is unified with and resides in the main register file. The unified register file, which incorporates the accumulator register, preferably is associated with the dense math execution unit.

In one or more embodiments, at 715 the accumulator register file is primed. In one or more embodiments, a group of one or more accumulator register file entries are primed. The accumulator register file, e.g., the group of one or more accumulator register file entries, is primed, in an embodiment, in response to an instruction for dense math execution unit operations. For example, where the accumulator register file is a source for the dense math execution unit operations, the accumulator register file is primed. Priming the accumulator register file, in an embodiment, includes synchronizing the data in the accumulator register file with data that resides in the main register file, e.g., the VS register file, or data that resides in main memory. For example, prime instructions can move data from the main register file to the accumulator register file. Priming the accumulator register file can also include clearing the data in the accumulator register file, e.g., setting the data in the accumulator register file entry to zero. In one or more embodiments, a dense math instruction, e.g., a MMA "ger" instruction, can have no accumulator register file source data and that dense math instruction will be considered self-priming. The accumulator register file in one or more aspects is primed when it is first written from the main register file, from main memory, or as a result of a self-priming instruction (where the data in the accumulator register file entry is set to zero). In one or more embodiments, the accumulator register file allocates an accumulator register file rename, the accumulator register file is primed, and the value of the data in the accumulator register file is set to the value in a main register file, in main memory, or set to zero.

At 715, in one or more embodiments, a checkpoint is created, e.g., started, and a checkpoint begin iTag is stored. In an aspect, the dispatch unit detects an instruction starting the checkpoint. The ICT in an embodiment starts the checkpoint and in an embodiment the checkpoint begin iTag is stored in the dispatch unit and/or a special-completion/ exceptions macro (SpComp). The dense math execution unit, e.g., the MMA and/or inference engine, in one or more embodiments at 720 undergoes dense math operations. That is, dense math operations are performed using the one or more dense math execution units, e.g., the inference engine and/or MMA unit(s).

At 730, it is determined whether a checkpoint boundary is being crossed. If a checkpoint boundary is not being crossed (730: No), then, at 740, the results of the dense math unit operation is written back to the accumulator register file entries currently being used, e.g., the inuse accumulator register file entries. That is, in an example, the accumulator register file entries are used as both a source and a target during dense math execution unit operations. The results of the dense math execution unit preferably are written back to the same target accumulator register file entries multiple times without renaming. That is, in an embodiment, a single accumulator register file target rename can be re-written multiple times. In one or more aspects, in response to a dense math execution unit instruction, e.g., a "ger" instruction, there is no write back to the main register file, and instead the accumulator register that is local to the dense math execution unit, e.g., the MMA unit, stores the result while the main register file does not store the result. In this manner, the dense math execution unit, e.g., the inference engine and/or MMA unit, operates without renaming main register file entries. In an embodiment, in response to the dense math execution unit writing results back to the accumulator register, the accumulator register file entries are flagged or marked, e.g., marked dirty.

If at 730 it is determined that a checkpoint boundary was or will be crossed (730: Yes), then at 735 a new checkpoint for the accumulator register file is started (e.g., new accumulator register file entries are primed) and the new checkpoint begin iTag is stored. If a new checkpoint is started at 735, then, at 740, the results of the dense math execution unit operations are written back to the new accumulator register file entries, e.g., the currently inuse accumulator register file entries since the new accumulator register file entries were created. In this manner, after the results of the dense math execution unit have been written back to the same accumulator register file entries for one or more times, e.g., until the iTag boundary is crossed, then, if an instruction targets the accumulator register file, new accumulator register file entries are allocated and receive the results of the dense math execution unit operations. In an aspect, the new checkpoint is created by the first iTag to target an accumulator register file entry that is not active. The first accumulator operation after crossing the iTag boundary in an aspect starts and or creates the new checkpoint. In one or more embodiments, the results in the old accumulator register file entries remain in the old accumulator register files entries. Alternatively, the mapping of the old previous accumulator register file entries in an aspect can be evicted.

Whether and how often to start or create a new checkpoint can be based on a number of factors or criteria. In accordance with an embodiment, the number "N" of instructions dispatched since the start of a checkpoint can be used to create a checkpoint boundary. In this aspect, the checkpoint boundary can be set at "N" number of instructions (iTags) after the checkpoint begin iTag. The number "N" can be prescribed, predetermined, previously set, and/or changed depending upon the desired performance. Where not many flushes are expected, the number "N" of instructions dispatched before a checkpoint can be large, or increased. In the examples described, the prescribed number "N" of instructions (iTags) since the checkpoint begin iTag can be sixty-four (64), although other numbers are contemplated. In this regard, the number of instructions to dispatch since the checkpoint begin iTag was dispatched is calculated, and if the number of instructions dispatched since the checkpoint started is equal to or greater than number "N", than the checkpoint boundary is crossed and a new checkpoint is or will be created at 735. If the number N of instructions to dispatch since the checkpoint begin iTag was dispatched is less than N, than the checkpoint boundary is not crossed and at 740 the current inuse accumulator register files are used to write back the results of the dense math operations.

Alternatively, the checkpoint boundary can be every Nth instruction. That is every Nth instruction there is a new checkpoint boundary. So in the example where the Nth instruction is set at sixty-four (64), the checkpoint boundaries would be at 64 instructions, 128 instructions, 192 instructions, (64 x N), etc. In this example, the checkpoint boundary iTag is calculated and determined and if an instruction passes one of those checkpoint boundaries, new accumulator register entries are primed and the results are written to the new accumulator register entries at 740.

At 745, it is determined whether the next instruction is part of the dense math execution unit operations. That is, it is determined whether or not the dense math operations have completed. One manner in which it can be determined if the dense math operations have completed is when the accumulator register file is deprimed. If the dense math operations are not complete, or the next instruction is part of the dense math operations, e.g., targets an accumulator register file entry (745: Yes), then at 745 the method continues to 720 and performs the dense math execution unit operations. In an embodiment, when the dense math execution unit operations are complete (745: No), the results of the accumulator register file are written back to the main register file, and/or to main memory at 750. In an embodiment, the accumulator register is deprimed, the values in the accumulator register file entries are written into the main register file (or main memory), and the accumulator register file entry is deallocated. In this regard, the results in the accumulator register files entries that are in the current checkpointed accumulator register file entries in use and completed are written to the main register file. In accordance with an embodiment, the main register file is written back in response to instructions, e.g., move from accumulator register file entry to main register file instructions (xxmfacc), and move from accumulator register file entry and store instructions (stxacc). The results of the accumulator register are also written back to the main register file when the main register file entry mapped to the accumulator register file entry is sourced or targeted and the accumulator register file entry is dirty. In an aspect, a defined read accumulator instruction will move data from the accumulator register file to the main register file. In an embodiment, after the accumulator is read, a series of store operations, e.g., "octo/quad word" store operations, will read the main register file and write to main memory.

In an embodiment, when the accumulator register file entry is dirty and is accessed by the main register, the hardware will de-prime the accumulator register file. In an aspect, when the main register file entry is targeted and the mapped accumulator register entry is primed, the hardware will de-prime the accumulator register even if the accumulator register was not dirty. The hardware will run a sequence that writes all the accumulator register file entries back to the main register file, the operation targeting the main register file entry will be executed, and each accumulator register file entry is deallocated from the rename pool, e.g., the freelist.

In an aspect, when a dense math instruction, e.g., a "ger" instruction, sources an accumulator register file that was not primed since the last de-prime (e.g., by xxmtacc or ldacc), the hardware will prime that accumulator register file entry. In an aspect, the hardware will run a sequence that primes the accumulator register file and allocates an accumulator register file entry (rename). The dense math instruction will then be executed.

Figure 8:
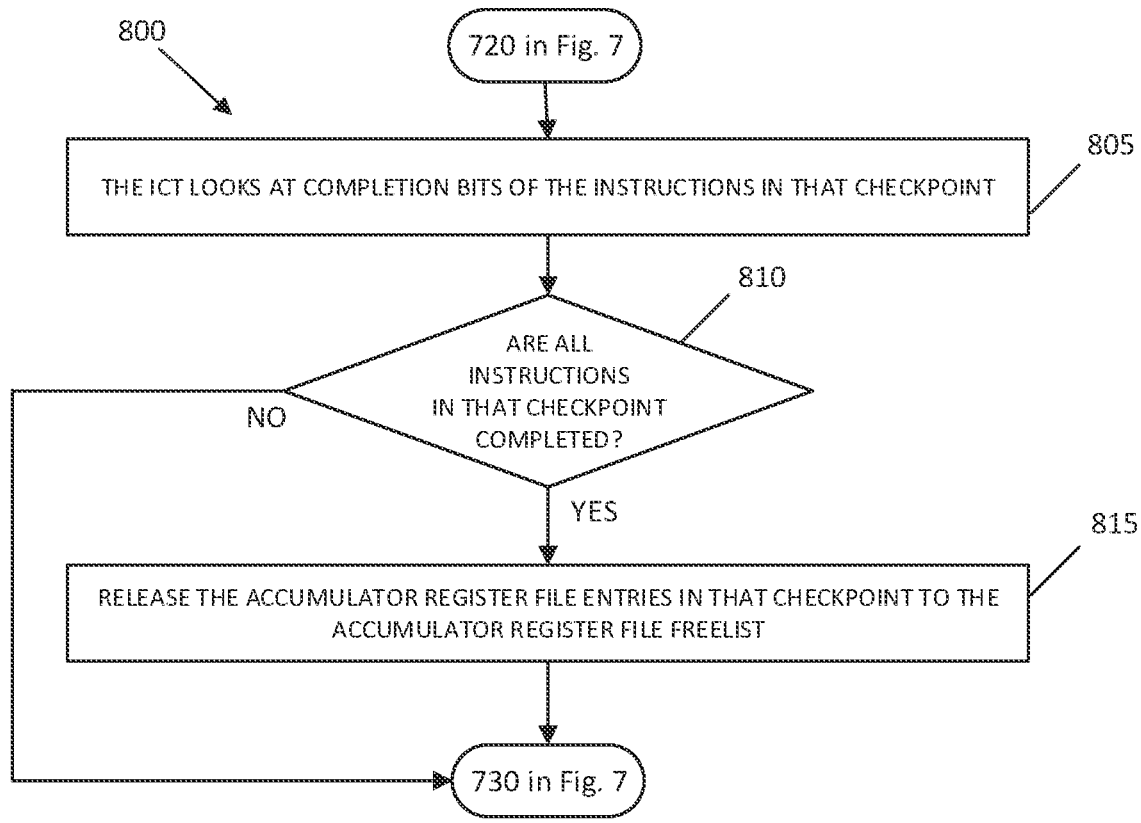
FIG. 8 illustrates a flow diagram of a method according to an embodiment for processing data in a processor, including a method of releasing accumulator register file entries back to a free list.

FIG. 8 is an exemplary flowchart in accordance with one embodiment illustrating and describing a method of handling data, e.g., executing instructions, in a processor, including in an embodiment, processing and handling dense math instructions, e.g, MMA ("ger") instructions, in a processor in accordance with an embodiment of the present disclosure. More specifically, the method 800 in an aspect is directed to releasing accumulator register file entries back to an accumulator free list so that the accumulator register file entries can be reused. While the method 800 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order.

Process 800 of releasing accumulator register file entries back to accumulator free list for reuse in one or more embodiments includes determining whether the instructions in a checkpoint have completed. In an embodiment, the process 800, for example, can occur as part of process 700, for example, after 720 where process 700 performs a dense math execution unit operation. At 805, the completion bits of the instructions in the checkpoint are checked, and at 810 it is determined if all the instructions in that checkpoint are completed. At 810 it can be determined if all the completion bits in the checkpoint indicate the instructions in the checkpoint have been completed, and in response to all the instructions in the checkpoint being completed, e.g., all the completion bits in the checkpoint in the ICT indicate all the instructions in the checkpoint are complete (810: Yes), then the process 800 continues to 815. At 815 all the accumulator register file entries in that checkpoint are released to the accumulator register file freelist (e.g., accumulator free list 472). The process 800 after 815 continues to process 700, for example step 730. On the other hand, if at 810, all the instructions in that checkpoint are not completed, e.g., all the completion bits in the checkpoint are not marked complete, then the process can continue to 730 as in the process 700.

Figure 9:
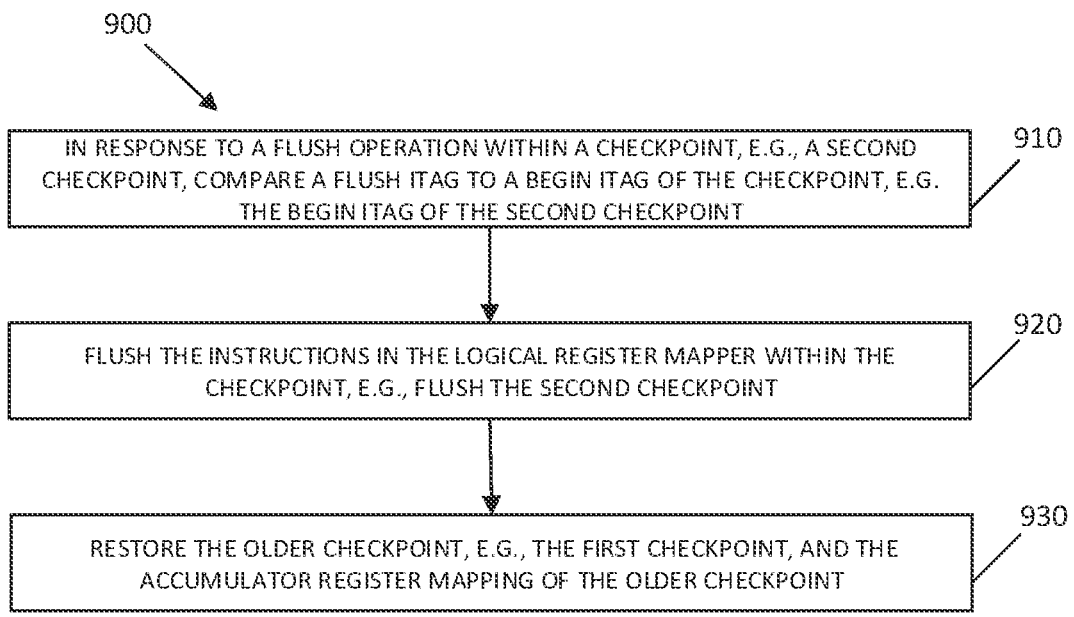
FIG. 9 illustrates a flow diagram of a method according to an embodiment of processing data in a processor, including flushing and restoring a checkpoint in a mapper.

FIG. 9 is an exemplary flowchart in accordance with one embodiment illustrating and describing a method of handling data, e.g., executing instructions, in a processor, including in an embodiment, processing and handling dense math instructions, e.g. MMA ("ger") instructions, in a processor in accordance with an embodiment of the present disclosure. More specifically, the method 900 in an aspect is directed to flushing and restoring a checkpoint in a mapper. While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order.

In process 900, at 910, in response to a flush operation within a checkpoint, for example a second checkpoint, the flush iTag is compared to the begin iTag of the checkpoint, for example the begin iTag of the second checkpoint. At 920, the checkpoint is flushed. That is, in an aspect. at 920 a new flush request is generated and the checkpoint, e.g., the second checkpoint, is flushed. At 930, the older checkpoint, e.g., the first checkpoint, and the accumulator register mapping of the older checkpoint are restored.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for processing information, the computer system comprising:
   at least one processor having a circuit and logic to process instructions, the processor comprising;
   a dispatch unit having a circuit and logic to dispatch instructions;
   an instruction completion table (ICT) having a circuit and logic to track dispatched instructions, the ICT having a plurality of entries to store data;
   a main register file associated with the at least one processor, the main register file having a circuit and a plurality of entries for storing data, one or more write ports to write data to the main register file entries, and one or more read ports to read data from the main register file entries;
   one or more execution units having a circuit and logic, the one or more execution units including a dense math execution unit;
   at least one accumulator register file having a circuit and a plurality of entries for storing data, the at least one accumulator register file associated with the dense math execution unit; and
   a mapper having a circuit and logic to map one or more main register file entries to one or more accumulator register file entries,
   wherein the processor is configured to prime the accumulator register file to receive data in response to an instruction targeting the accumulator register file, and in response to priming the accumulator register file a first checkpoint is created and the dispatch unit sends a first checkpoint begin iTag corresponding to the first checkpoint to the ICT and stores the first checkpoint begin iTag;
   wherein the processor is configured to process data in the dense math execution unit where the results of the dense math execution unit are written to a first group of one or more accumulator register file entries, and after a checkpoint boundary is crossed the results of the dense math execution unit are written to a second group of one or more accumulator register file entries; and
   wherein the dispatch unit notifies the mapper that the second group of accumulator register file entries is being allocated and the mapper renames the first group of one or more accumulator register file entries to the second group of accumulator register file entries.

2. The computer system of claim 1, wherein the processor is configured to write results back to the first group of one or more accumulator register file entries multiple times.

3. The computer system of claim 1, wherein the processor is further configured to write data from the groups of one or more accumulator register file entries to the main register file.

4. The computer system of claim 3, wherein the processor is configured to write data from the groups of one or more accumulator register file entries to a plurality of main register file entries in response to an instruction accessing a main register file entry that is mapped to an accumulator register file entry in the groups of one or more accumulator register file entries.

5. The computer system of claim 1, wherein the accumulator register file is local to the dense math unit.

6. The computer system of claim 5, wherein the dense math execution unit is a matrix-multiply-accumulator (MMA) unit and the accumulator register file is located in the MMA.

7. The computer system of claim 1, wherein the bit field width of the accumulator register file is wider than the bit field width of the main register file.

8. The computer system of claim 7, wherein each entry in the accumulator register file is mapped to a plurality of main register file entries.

9. The computer system of claim 1, wherein, the checkpoint boundary is based upon the number "N" of instructions dispatched since the first checkpoint begin iTag, and after the dispatch unit dispatches the number "N" of instructions, the dispatch unit detects that a dispatched instruction will trigger the allocation of the second group of accumulator register file entries and a second checkpoint is created.

10. The computer system of claim 9, wherein, in response to the second checkpoint being created, the dispatch unit sends a second checkpoint begin iTag to the ICT corresponding to the second checkpoint and stores the second checkpoint begin iTag.

11. The computer system of claim 10, wherein the dispatch unit tracks a current checkpoint begin iTag, and all instructions younger than the current checkpoint begin iTag belong to the checkpoint associated with the respective group of one or more accumulator register file entries.

12. The computer system of claim 9, wherein the ICT determines based upon the number of instructions dispatched by the dispatch unit, which instructions belong to the respective checkpoint.

13. The computer system of claim 1, wherein an encoding is provided in the ICT entries to identify an instruction either as a checkpoint begin iTag or as an in a checkpoint iTag.

14. The computer system of claim 9, wherein each checkpoint is not complete and the accumulator register file entries are not released for reuse until all the instructions (iTags) within the respective checkpoint are finished.

15. The computer system of claim 14, wherein the ICT looks at the completion bits of all the instructions within the respective checkpoint and if all the instructions in the respective checkpoint are finished, the respective checkpoint is complete and the respective checkpoint mapping is released to a freelist of accumulator register file entries ready to be reallocated for use.

16. The computer system of claim 9, wherein in response to a flush operation within the second checkpoint, a flush iTag is compared against the second checkpoint begin iTag and the second checkpoint is flushed and the first checkpoint and accumulator register mapping of the first checkpoint is restored.

17. A processor for processing information, the processor comprising:
- a main register file associated with the at least one processor, the main register file having a circuit and a plurality of entries for storing data, one or more write ports to write data to the main register file entries, and one or more read ports to read data from the main register file entries;
- one or more execution units having a circuit and logic, the one or more execution units including a dense math execution unit;
- at least one accumulator register file having a circuit and a plurality of entries for storing data, the at least one accumulator register file associated with the dense math execution unit, and the bit field width of the accumulator register file being wider than the bit field width of the main register file;
- a dispatch unit having a circuit and logic to dispatch instructions;
- an instruction completion table (ICT) having a circuit and logic to track dispatched instructions, the ICT having a plurality of entries to store data; and
- a mapper having a circuit and logic to map one or more main register file entries to one or more accumulator register file entries,
- wherein the processor is configured to prime the accumulator register file to receive data in response to an instruction targeting the accumulator register file, and in response to priming the accumulator register file a first checkpoint is created and the dispatch unit sends a first checkpoint begin iTag corresponding to the first checkpoint to the ICT and stores the first checkpoint begin iTag;
- wherein the processor is configured to process data in the dense math execution unit where the results of the dense math execution unit are written to a first group of one or more accumulator register file entries multiple times, and after crossing a checkpoint boundary the results of the dense math execution unit are written to a second group of one or more accumulator register file entries, and
- wherein the processor is configured to write data from the groups of one or more accumulator register file entries back to the main register file entries.

18. The computer system of claim 17, wherein, the checkpoint boundary is based upon the number "N" of instructions dispatched after the first checkpoint begin iTag, and after the dispatch unit dispatches the number "N" of instructions, the dispatch unit detects when a dispatched instruction will trigger the allocation of the second group of accumulator register file entries and a second checkpoint is created, the dispatch unit notifies the mapper that the second group of accumulator register file entries is being allocated and the mapper renames the first group of one or more accumulator file entries to the second group of file entries, and in response to the second checkpoint being created, the dispatch unit sends a second checkpoint begin iTag corresponding to the second checkpoint to the ICT and stores the second checkpoint begin iTag.

* * * * *